(12) United States Patent
Niwano et al.

(10) Patent No.: US 7,694,149 B2
(45) Date of Patent: Apr. 6, 2010

(54) METHOD FOR JUDGING USE PERMISSION OF INFORMATION AND CONTENT DISTRIBUTION SYSTEM USING THE METHOD

(75) Inventors: Satoshi Niwano, Moriguchi (JP); Katsumi Tokuda, Ikeda (JP); Kouji Miura, Matsubara (JP)

(73) Assignee: Panasonic Corporation, Osaka (JP)

( * ) Notice: Subject to any disclaimer, the term of this patent is extended or adjusted under 35 U.S.C. 154(b) by 886 days.

(21) Appl. No.: 10/564,986

(22) PCT Filed: Oct. 5, 2004

(86) PCT No.: PCT/JP2004/014996

§ 371 (c)(1),
(2), (4) Date: Jan. 18, 2006

(87) PCT Pub. No.: WO2005/045651

PCT Pub. Date: May 19, 2005

(65) Prior Publication Data

US 2006/0272026 A1 Nov. 30, 2006

(30) Foreign Application Priority Data

Nov. 11, 2003 (JP) ............................. 2003-380849

(51) Int. Cl.
*G06F 21/00* (2006.01)
(52) U.S. Cl. ...................................... 713/184; 713/176
(58) Field of Classification Search ......... 713/182–186; 707/1

See application file for complete search history.

(56) References Cited

U.S. PATENT DOCUMENTS 6,185,684 B1   2/2001   Pravetz et al.

(Continued)

FOREIGN PATENT DOCUMENTS

JP   2003-51816   2/2003

OTHER PUBLICATIONS

Secure Electronic Commerce: Building the Infrastructure for Digital Signatures and Encryption, entitled "*Digital Signatures*", published by Warwick Ford and Michael Baum, Pearson Education, Co., Ltd., 1997, pp. 109-110.

(Continued)

*Primary Examiner*—Pierre M Vital
*Assistant Examiner*—Christopher J Raab
(74) *Attorney, Agent, or Firm*—Wenderoth, Lind & Ponack, L.L.P.

(57) ABSTRACT

A method is provided for judging use permission of information on one or more terminal apparatuses which use content provided by a content provider and metadata provided by a metadata provider and supplementing the content, the method comprising: metadata use permission judgment judging use permission of the metadata based on usage control information regarding use control of the metadata; and using the metadata in the case where in said metadata use permission judgment, the use of the metadata is permitted. Specifically, the usage control information includes the first signer identification information which identifies the range of the provider of the metadata that can be used. The metadata includes a signature of the metadata provider identified in the first signer identification information, and the second signer identification information identifying the signer of the signature. And, said metadata use permission judgment judges the metadata use permission based on the metadata provider identified in said first signer identification information, said second signer identification information, and signature verification.

11 Claims, 10 Drawing Sheets

U.S. PATENT DOCUMENTS

| | | | |
|---|---|---|---|
| 6,205,549 B1 | 3/2001 | Pravetz | |
| 6,304,715 B1 | 10/2001 | Abecassis | |
| 6,351,813 B1 | 2/2002 | Mooney et al. | |
| 6,353,831 B1* | 3/2002 | Gustman | 707/103 R |
| 6,834,110 B1* | 12/2004 | Marconcini et al. | 380/239 |
| 6,920,567 B1* | 7/2005 | Doherty et al. | 726/22 |
| 7,213,036 B2* | 5/2007 | Apparao et | 707/104.1 |
| 7,216,131 B2* | 5/2007 | Saari et al. | 707/104.1 |
| 2001/0055472 A1 | 12/2001 | Nakahara et al. | |
| 2002/0033842 A1 | 3/2002 | Zetts | |
| 2002/0099947 A1 | 7/2002 | Evans | |
| 2003/0012549 A1 | 1/2003 | Ohnuma | |
| 2003/0122966 A1 | 7/2003 | Markman et al. | |
| 2003/0208681 A1 | 11/2003 | Muntz et al. | |
| 2004/0176092 A1* | 9/2004 | Heutschi | 455/435.1 |
| 2004/0267693 A1* | 12/2004 | Lowe et al. | 707/1 |
| 2005/0038813 A1* | 2/2005 | Apparao et al. | 707/104.1 |
| 2008/0021926 A1* | 1/2008 | Brock et al. | 707/104.1 |

OTHER PUBLICATIONS

Secure Electronic Commerce: Building the Infrastructure for Digital Signatures and Encryption, entitled "*Certification Paths*", published by Warwick Ford and Michael Baum, Pearson Education, Co., Ltd., 1997, pp. 184-185.

Secure Electronic Commerce: Building the Infrastructure for Digital Signatures and Encryption, entitled "*Certificate Revocation Lists*", published by Warwick Ford and Michael Baum, Pearson Education, Co., Ltd., 1997, pp. 217-218.

* cited by examiner

FIG. 3

User information DB 110

| User ID | Domain key |
|---------|------------|
| XXXAAA  | XXXCCC     |
| XXXBBB  | XXXDDD     |
| ⋮       | ⋮          |

111 — User ID column
112 — Domain key column

FIG. 6

| License 410 | | | |
|---|---|---|---|
| 411 | License ID | | |
| 412 | Content ID | | |
| 413 | Content provider ID | | |
| 414 Usage rules | 4140 Content use control information | Information about use expiration date | |
| | | Information about possible use frequency | |
| | 4144 Metadata use control information | 4142 Signer identification information | (a) Impossible except for content provider<br>(b) Possible for content provider and metadata provider authorized by content provider<br>(c) Possible for all (Metadata signer ID) |
| | | 4145 Reference specification information | (a) Metadata reference specifying flag<br>(b) ID of metadata desirable to force reference |
| | | 4146 Revision permission information | Flag indicating "metadata revisable" or "metadata non-revisable", ID of revisable metadata or non-revisable metadata Metadata signer of metadata digital signature that is revisable or non-revisable ID312 |
| | | 4147 Control permission information | Flag indicating control permission according to metadata generated by user<br>(Metadata ID)<br>(Metadata signer ID) |
| | | 4148 Moving range specifying information | (a) Move unlimited<br>(b) Limited to terminal apparatus owned by user who generated metadata |
| 415 | Content encryption key | | |

METHOD FOR JUDGING USE PERMISSION OF INFORMATION AND CONTENT DISTRIBUTION SYSTEM USING THE METHOD

TECHNICAL FIELD

The present invention relates to a system in which, through broadcast and communication, digital contents such as video and music, license for digital content, and metadata including attributes of digital content or control information are distributed, and a user uses digital content by one or more terminal apparatuses. In particular, the present invention relates to a system comprising a method for judging use permission of metadata and an apparatus to which the method for judging use permission is applied.

BACKGROUND ART

In recent years, a content distribution service capable of distributing digital contents such as music, video and games (hereinafter referred to as content) from a server apparatus to one or more terminal apparatuses through communication such as Internet, digital broadcast, Cable Television (CATV), and of using the content in one or more terminal apparatuses has been developed for a practical use. A common system used for the content distribution service uses a copyright protection technique for protecting a copyright of content in order to prevent an illegal use of the content by a malicious user. The copyright protection technique is, in detail, a technique of securely controlling use of content by a user such as reproducing the content or copying it to a recording media using an encoding technique, identifying technique and the like. Using the copyright protection technique allows a provider such as a content provider and a service provider to securely control the use of content in the one or more terminal apparatuses by a user.

By the way, in recent years, in order to promote sales, metadata which is data for supplementing the explanation for a content body is distributed from a content provider and the like to one or more terminal apparatuses; and the metadata is utilized by the one or more terminal apparatuses. Thus, new forms of content use such as scene search of content and digest viewing are being developed.

On the other hand, there is a case where unintended and unauthorized metadata such as scene index for skipping Commercial Message (CM) is circulated. And, the content provider providing digital content is requested to prevent the above mentioned circulation of unauthorized metadata. Thus, a method for excluding unauthorized metadata by using a digital signature assigned to metadata by a metadata provider that generated the metadata is suggested (refer to Japanese Laid-Open Patent publication No. 2003-51816).

Conventionally, as disclosed in the above mentioned Japanese Laid-Open Patent publication No. 2003-51816 and the like, by using verification of a digital signature, validity of metadata signer and tamper of metadata content have been detected, and use permission of the metadata has been judged.

Here, the use permission judgment of metadata using the conventional technique of digital signature will be explained.

For verification of a digital signature of metadata, digitally signed metadata, a public key certificate of a metadata signer, and a Certificate Revocation List (CRL) which is a list of revoked public key certificates are used. The digital signature to metadata is executed by a content provider or a metadata provider.

In the one or more terminal apparatuses, in the case where metadata is used, use permission of the metadata is judged by the following procedures.

First, whether the signer ID of the signer who has digitally signed the metadata is included in the CRL is confirmed. Here, the signer ID means identification information which uniquely identifies a signer. In the case where the signer ID is included in the CRL, the metadata is judged as impossible to be used. In the case where the signer ID is not included in the CRL, the signature of the metadata is verified by the public key certificate, and existence or non-existence of tamper is detected. In the case where tamper is detected, the metadata is judged as impossible to be used. In the case where modification is not detected, the metadata is judged as possible to be used.

In other words, after confirming that the metadata has been digitally signed by the metadata provider having an unrevoked signer ID, only in the case of confirming that the metadata is not tampered, reproduction of the metadata is permitted. The verification of the digital signature is specifically disclosed in "Secure Electronic Commerce: Building the Infrastructure for Digital Signatures and Encryption" published by Warwick Ford and Michael Baum, Pearson Education Co., Ltd. in 1997.

However, in the metadata use permission judgment according to the conventional technique of digital signature verification, failure caused by unauthorized metadata occurs at least once, and a CRL is generated after discovering tamper. Therefore, for the important content for which failure caused by unauthorized metadata should not occur, the content provider itself examines the content of the metadata, and desires to permit only the metadata which has been digitally signed. In such case as described above, there is a problem that the above mentioned desire cannot be realized only by the conventional verification of digital signature.

Also, a user privately generates metadata, and desires to use the metadata only in the one or more terminal apparatuses owned by the user. However, in the metadata use permission judgment according to the conventional digital signature, metadata can only be used in all of the one or more terminal apparatuses or cannot be used. Therefore, there is a problem that even if a content provider attempts to permit such use as described above, the use range of the metadata generated by a user cannot be limited to the one or more terminal apparatuses owned by the user.

In addition, depending on the content, there is a case where the content provider desires to limit generation or revision of metadata by a user, or the content provider desires to cause the metadata, specified by the content provider, to be used. However, there is a problem that such cases as described above cannot be realized only by a digital signature.

In other words, according to the conventional verification of a digital signature using a CRL, there is a problem that metadata cannot be flexibly used.

The object of the present invention, in view of such problems as described above, is to provide a content distribution system comprising: a method for judging metadata use permission which can limit metadata that can be used for each content, and limit the use range of the metadata generated by the user; and one or more apparatuses that execute judgment according to the method for judging metadata use permission.

In other words, the object of the present invention is to provide: a method for judging information use permission that can certainly exclude the use of unauthorized metadata and enables the flexible use of metadata; and a content distribution system using the above mentioned method.

DISCLOSURE OF INVENTION

In order to solve such problems as described above, the method for judging information use permission according to the present invention is a method for judging use permission of information on one or more terminal apparatuses which uses content provided by a content provider and metadata which is data provided by a metadata provider and supplementing the content, the method comprising: judging use permission of the metadata based on usage control information regarding use control of the metadata; and using the metadata in the case where it is judged that the use of the metadata is permitted in said judgment.

More specifically, the usage control information includes the first signer identification information identifying the range of the provider of the metadata that can be used, the metadata includes the signature of the metadata provider identified in the first signer identification information, and the second signer identification information identifying the signer of the signature, and in said judgment, it is judged whether the metadata use is permitted based on the metadata provider identified in said first signer identification information, said second signer identification information, and signature verification.

Also, the usage control information includes reference specification information specifying a reference method of metadata in using content, and in said judgment, metadata use permission in using content is judged based on the reference specification information.

In addition, the usage control information includes revision permission information indicating revision permission of meta information, and in said judgment, use permission of metadata is judged based on the revision permission information.

Moreover, the usage control information includes control permission information indicating use permission of user metadata generated by a user in the one or more terminal apparatuses, and in said judgment, metadata use permission is judged based on the control permission information.

Furthermore, the usage control information includes moving range specifying information which specifies the moving range of the user metadata generated by a user in the one or more terminal apparatuses, and in said judgment, metadata use permission is judged based on the moving range specifying information.

As described above, according to the present invention, without judging whether metadata is revoked or not, using a CRL as conventionally, based on the usage control information regarding metadata use control included in the content license and the like, that is specifically, (i) signer identification information, (ii) reference specification information, (iii) revision permission information, (iv) control permission information and (v) moving range specifying information, use permission of the metadata can be judged. Thus, use of unauthorized metadata can be certainly excluded, and flexible use of metadata can be achieved.

In other words, without using a CRL, by using the content license, it is possible to limit metadata that can be used to only the metadata that has been digitally signed by the content provider. Also, it is possible to cause the metadata, specified by the content provider, to be used. Moreover, it is possible to limit generation and revision of metadata by a user, and the moving range of metadata generated by the user.

The present invention can not only be realized as the above mentioned method for judging information use permission, but also as (i) one or more terminal apparatuses that have characteristic steps, as means, included in the above mentioned method for judging information use permission, (ii) a content distribution system including the above mentioned one or more terminal apparatuses, and (iii) a program which causes a computer to execute such steps as described above. Needless to say, the above mentioned program can be distributed via a recording medium such as a CD-ROM or a transmission medium such as Internet.

Further Information about Technical Background to this Application

The disclosure of Japanese Patent Application No. 2003-380849 filed on Nov. 11, 2003 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 3 is a diagram showing a table structure of the user information DB110 according to the embodiment of the present invention;

FIG. 6 is a diagram showing the structure of the license 410 according to the embodiment of the present invention;

BEST MODE FOR CARRYING OUT THE INVENTION

The embodiment of the present invention will be specifically explained using the drawings as follows.

Figure 1:
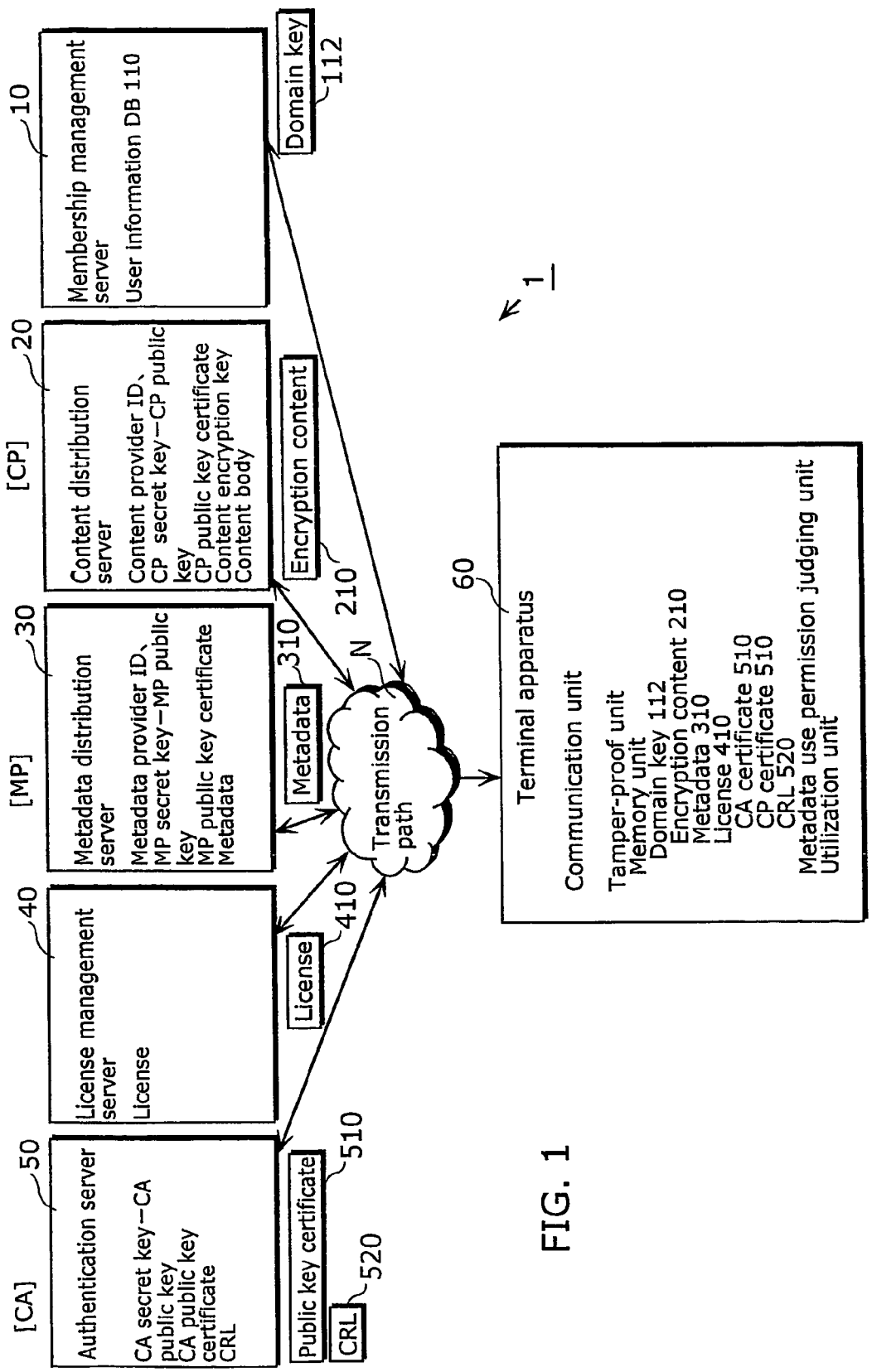
FIG. 1 is a diagram showing an overall schematic structure of the content distribution system 1 according to the embodiment of the present invention.

FIG. 1 is a diagram showing an overall schematic structure of the content distribution system according to the embodiment of the present invention.

As shown in FIG. 1, the content distribution system 1 comprises: a membership management server 10; a content distribution server 20; a metadata distribution server 30; a license management server 40; an authentication server 50; one or more terminal apparatuses 60; and a transmission path N connecting such components as described above so that they can be communicated with each other.

The membership management server 10 is a computer apparatus including user information DB110 for managing the user who subscribes to the content distribution system 1, and transmits a domain key 112 to the one or more terminal apparatuses 60.

The content distribution server 20 is a computer apparatus used by a content provider (CP), and includes: a content provider ID212; a secret key for the content provider; a public key for the secret key; a public key certificate; a content encryption key 415; and a content body. And, the content distribution server 20 at least generates encryption content 210 and transmits the encryption content 210 to the one or more terminal apparatuses 60.

The metadata distribution server 30 is a computer apparatus used by a metadata provider (MP), and includes: a metadata provider ID; a secret key for the metadata provider; a public key for the secret key; a public key certificate 510; and metadata 310. And, the metadata distribution server 30 at least generates metadata 310 for content, and transmits the metadata 310 to the one or more terminal apparatuses 60.

The license management server 40 at least generates a license 410 for using the encryption content 210 and the metadata 310, and transmits the license 410 to the one or more terminal apparatuses 60.

The authentication server 50 is a computer apparatus used by a Certification Authority (CA), and includes a secret key for the CA, a public key for the secret key, and the like. And, the authentication server 50 at least generates a public key certificate 510 for the CP, MP and CA and a CRL 520, and transmits the CRL 520 to the one or more terminal apparatuses 60.

The one or more terminal apparatuses 60 at least use the encryption content 210 and the metadata 310. The one or more terminal apparatuses 60 include a communication unit, a tamper-proof unit and the like. And, the processes related to encryption such as authentication communication, obtaining an encryption key, encryption and decoding are executed by the tamper-proof unit so that outflow of the encryption key and the like do not occur. Also, the tamper-proof unit includes: the domain key 112; the encryption content 210; the metadata 310; the license 410; the CA public key certificate 510; a memory unit for memorizing the CRL 520 and the like; a metadata use permission judging unit judging the use permission of the metadata; and a utilization unit using content and metadata based on the judging result of the metadata use permission judging unit.

The transmission path N is a communication network such as Internet, a digital broadcast, or a multiple network thereof.

Next, the process outline leading to the use of the metadata 310 and the encryption content 210 in the content distribution system 1 will be explained.

Figure 2:
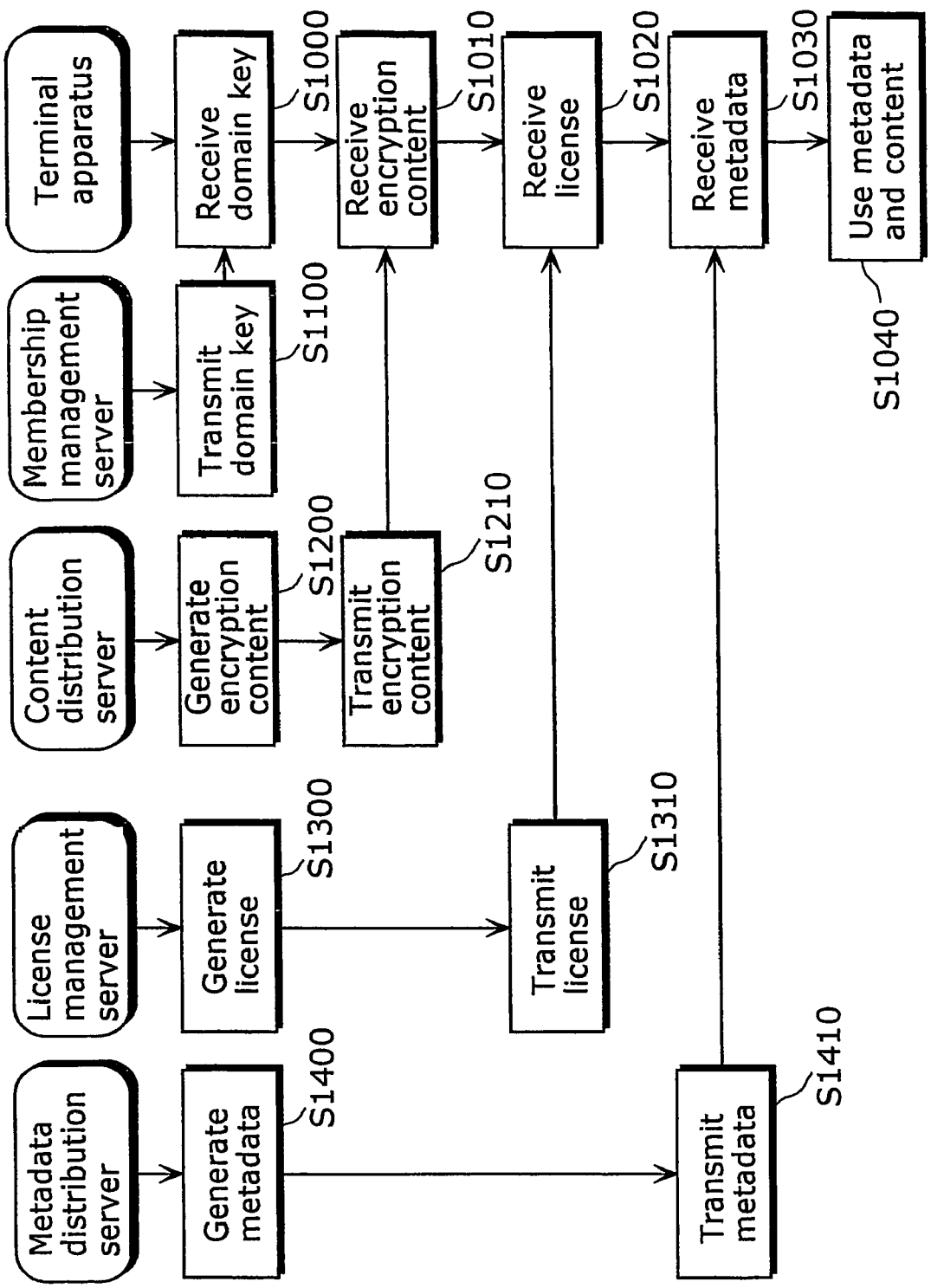
FIG. 2 is a flow chart showing schematic processes of the content distribution system according to the present invention.

FIG. 2 is a sequence diagram showing the communication procedures leading to the use of the metadata 310 and the encryption content 210.

The membership management server 10 distributes the domain key 112 to the one or more terminal apparatuses 60 based on the member's registered request (S1100).

The content distribution server 20 generates the encryption content 210 (S1200), and transmits the encryption content 210 to the one or more terminal apparatuses 60 based on the content obtainment request (S1210).

The metadata distribution server 30 generates the metadata 310 (S1400), and transmits the generated metadata 310 to the one or more terminal apparatuses 60 based on the metadata obtainment request from the one or more terminal apparatuses 60 (S1410).

The license management server 40 generates the license 410 (S1300), and transmits the license 410 to the one or more terminal apparatuses 60 based on the license purchase request (S1310).

The one or more terminal apparatuses 60 (i) receive the domain key 112 from the membership management server 10 (S1000), (ii) receive the encryption content 210 from the content distribution server 20 (S1010), (iii) receive the license 410 from the license management server 40 (S1020), (iv) receive the metadata 310 from the metadata distribution server 30 (S1030), and (v) use the metadata 310 and the encryption content 210 (S1040).

For the encryption of the content as described below, in general, the secret-key cryptography algorithms such as Advanced Encryption Standard (AES) and Triple Data Encryption Standard (Triple DES) are used. However, the below mentioned process does not depend on a particular encryption.

Also, for the format of digital signature, in general, the public-key cryptography algorithms such as RSA and Elliptic Curve Digital Signature Algorithm (EC-DSA) are used. However, the below mentioned process does not depend on a particular encryption.

In addition, for the Hash calculation format, Secure Hash Algorithm 1 (SHA-1), MD5 and the like are used in general. However, the below mentioned process does not depend on a particular calculation format.

Moreover, for the user interface screen of the content selection screen and the like transmitted, to the one or more terminal apparatuses 60, from the membership management server 10, the content distribution server 20, the metadata distribution server 30 and the license management server 40, the web page written in the script languages such as Hyper Text Markup Language (HTML) transmitted from a protocol such as Hyper Text Transfer Protocol (HTTP) and Extensible Markup Language (XML), or the page written in Broadcasting Markup Language (BML) transmitted by digital broadcast are used in general. However, the below mentioned process does not depend on a particular page writing format.

First, the process leading to the reception of the domain key by the one or more terminal apparatuses 60 will be specifically explained.

The membership management server 10, as shown in FIG. 3, includes the user information DB110 made of pairs of the user ID111 and the domain key 112. Here, the user ID111 means the ID provided to each of the owners of the one or more terminal apparatuses 60. Also, the domain means an assemble formed by the one or more terminal apparatuses 60 owned by users. And, the domain key 112 means the encryption key used for data encryption and authentication communication so that data communication is limited only between the one or more terminal apparatuses having the same domain key 112. For example, in FIG. 3, the domain key 112 of "XXXCCC" is assigned to the user ID111 of "XXXAAA".

The one or more terminal apparatuses 60 transmit the member's registered request including the user ID111 to the membership management server 10. The membership management server 10, after receiving the request for terminal registration from the one or more terminal apparatuses 60, obtains the domain key 112 corresponding to the user ID111 from the user information DB110, and transmits the domain key 112 to the one or more terminal apparatuses 60 (S1100). The one or more terminal apparatuses 60 receive the domain key 112 (S1000), and store the received domain key 112 in the memory unit of the tamper-proof unit.

In the case where the domain key 112 is communicated between the membership management server 10 and the one or more terminal apparatuses 60 through the communication path N, in order to ensure security, after Secure Authenticated Channel (hereinafter referred to as SAC) such as Secure Socket Layer (SSL) is established, data is communicated.

According to the present embodiment, after SAC is established between the membership management server 10 and the one or more terminal apparatuses 60, the domain key 112 is communicated. However, in the case where an intrinsic key (for example, a terminal ID) is stored in the one or more terminal apparatuses 60, and the membership management server 10 manages the intrinsic key of each terminal apparatus 60, the domain key 112 may be encrypted by the intrinsic key of the one or more terminal apparatuses 60, and transmitted from the membership management server to the one or more terminal apparatuses 60.

Next, the process leading to the reception of the encryption content 210 will be specifically explained.

The one or more terminal apparatuses 60 transmit the content selection request to the content distribution server 20. The content distribution server 20, according to the content selection request of the one or more terminal apparatuses 60, generates a content selection screen, and transmits the content selection screen to the one or more terminal apparatuses 60. The one or more terminal apparatuses 60 display the content selection screen received from the content distribution server 20, and transmits, to the content distribution server 20, the content obtainment request including the content ID211 of the content selected by the user's operation. As for the content selection screen, after the content is selected by the one or more terminal apparatuses 60, the content obtainment request including the corresponding content ID211 is transmitted to the content distribution server 20.

The content distribution server 20 generates the encryption content 210 (S1200). More specifically, the content distribution server 20, to the content body 213, by adding the content ID211 which differs for each content and the content provider ID212 which differs for each content provider, and encrypting the content provider ID212 and the content body 213 with the content encryption key 415, generates the encryption content 210.

Figure 4:
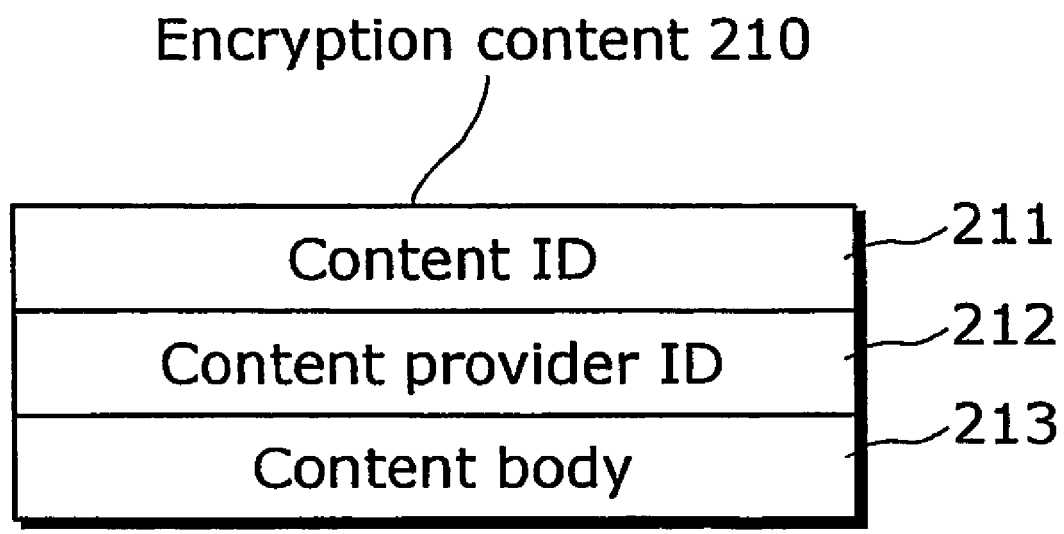
FIG. 4 is a diagram showing the structure of the encryption content 210 according to the embodiment of the present invention.

The encryption content 210, as shown in FIG. 4, includes the content ID211, the content provider ID212 and the content body 213. The content provider ID212 and the content body 213 are encrypted by the content encryption key 415 included in the license 410.

The content ID211 is used to associate the license 410 with the encryption content 210. The content provider ID212 is used to identify the provider of the encryption content 210. The content body 213 is digital data such as video and music.

The content distribution server 20 transmits, to the one or more terminal apparatuses 60, the encryption content 210 corresponding to the content ID211 included in the content obtainment request (S1210). The one or more terminal apparatuses 60 receive the encryption content 210 from the content distribution server 20 (S1010), and stores the received encryption content in the memory unit of the tamper-proof unit.

The transmission of the encryption content 210 from the content distribution server 20 to the one or more terminal apparatuses 60 may be executed by either streaming or file distribution.

Next, the process leading to the reception of the metadata 310 will be specifically explained.

The one or more terminal apparatuses 60 transmit the metadata selection request to the metadata distribution server 30. The metadata distribution server 30, according to the metadata obtainment request from the one or more terminal apparatuses 60, generates the metadata selection screen, and transmits the generated metadata selection screen to the one or more terminal apparatuses 60. The one or more terminal apparatuses 60 display the received metadata selection screen, and transmits the metadata obtainment request including the metadata ID of the metadata 310 selected by the user's operation to the metadata distribution server 30. As for the metadata selection screen, after the desirable metadata is selected by the one or more terminal apparatuses 60, the metadata obtainment request including the corresponding metadata ID is transmitted to the metadata distribution server 30.

The metadata distribution server 30 generates the metadata 310 (S1400). More specifically, the metadata distribution server 30 generates the metadata body 311, and stores the ID of the metadata provider into the metadata signer ID312. Thus, the metadata distribution server 30 generates a digital signature 313 for the metadata body 311 and the metadata signer ID312. There is also a case where the digital signature of the metadata 310 is executed by the content distribution server 20. In such case as described above, the metadata body 311 is transmitted from the metadata distribution server 30 to the content distribution server 20. Then, the content distribution server 20 stores the content provider ID into the metadata signer ID312, and generates the metadata 310 by generating the digital signature 313 of the content provider. And, the metadata 310 is transmitted to the metadata distribution server 30.

Figure 5:
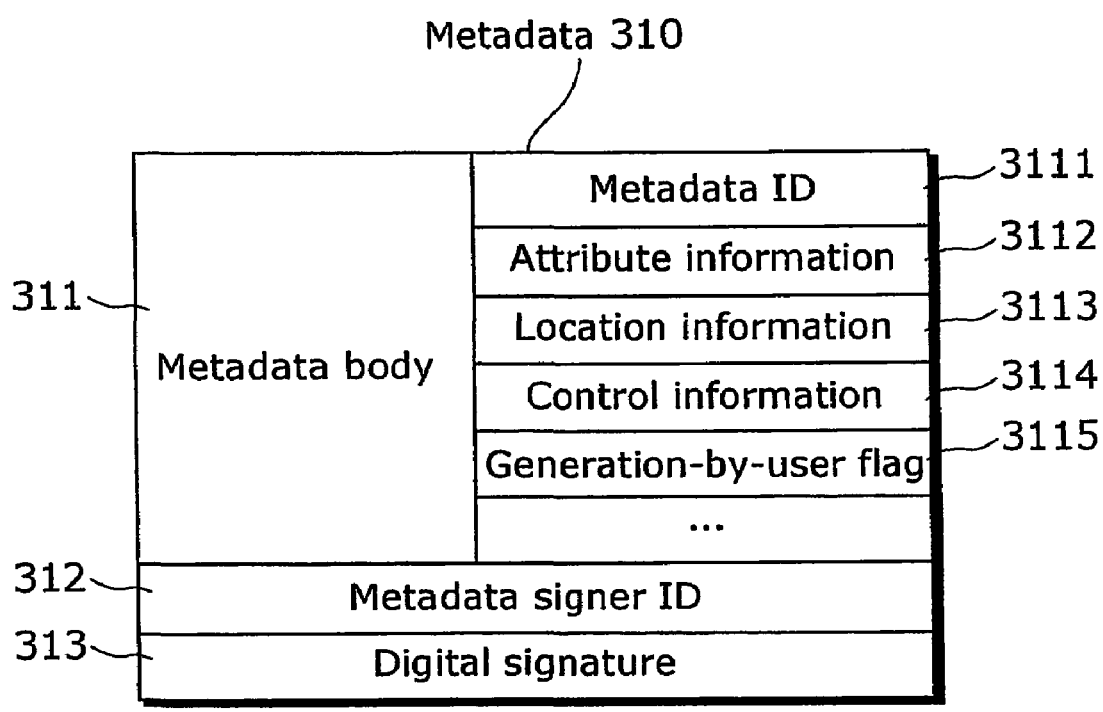
FIG. 5 is a diagram showing the structure of the metadata 310 according to the embodiment of the present invention.

The metadata 310, as shown in FIG. 5, includes the metadata body 311, the metadata signer ID312, and the digital signature 313.

The metadata body 311 includes, in addition to the metadata per se: the metadata ID3111 for identifying metadata; attribute information 3112 such as a content ID; location information 3113 for content; control information 3114 for content such as a scene index; and a generation-by-user flag 3115 for indicating that the metadata is the metadata generated by the user. The metadata signer ID312 is used to identify the signer who has digitally signed the metadata 310. The digital signature 313 is used for detecting tamper of the metadata body 311.

The metadata distribution server 30 transmits, to the one or more terminal apparatuses 60, the metadata 310 corresponding to the metadata ID included in the metadata obtainment request (S1410). The one or more terminal apparatuses 60 receive the metadata 310 from the metadata distribution server (S1030) and store the received metadata 310 in the memory unit of the tamper-proof unit.

Next, the process leading to the reception of the license 410 of the content will be explained.

The one or more terminal apparatuses 60 transmit the license selection request to the license management server 40. The license management server 40, according to the license selection request from the one or more terminal apparatuses 60, generates the license selection screen, and transmits the generated license selection screen to the one or more terminal apparatuses 60. The one or more terminal apparatuses 60 display the received license selection screen, and transmits, to the license management server 40, the license purchase request including the license ID411 of the license 410 selected by the user's operation. As for the license selection screen, after the desirable license is selected, the license purchase request including the corresponding license ID is transmitted to the license management server 40.

The license management server 40 generates the license 410 including the corresponding license ID when the license purchase request is made (S1300). More specifically, the license management server 40 receives, from the content distribution server 20: a content ID412; a content provider ID413; usage rules 414; and a content encryption key 415, and generates the license 410 by adding the license ID411 (S1300).

The license 410, as shown in FIG. 6, includes: the license ID411; the content ID412; the content provider ID413; the usage rules 414; and the content encryption key 415.

The license ID411 is used for identifying the license 410 in the license management server 40. The content ID412 is used for associating the license 410 with the encryption content 210. The content provider ID413 is used for identifying the content provider of the content controlled by the license 410. The usage rules 414 are used for controlling the use of the content and metadata. The content encryption key 415 is used for decoding the content.

More specifically, the usage rules 414 include information regarding content use control 4140 and information regarding metadata use control 4144.

As the information regarding content use control 4140, there are information regarding use expiration date 4141, information regarding possible use frequency 4142, and the like. As the information regarding use expiration date 4141, for example, information such as "use possible until Dec. 31 of 2005" is included. As the information regarding possible use frequency 4142, for example, information such as "use possible for three times" is included.

As the information regarding metadata use control 4144, there are signer identification information 4145 of metadata, reference specification information 4146 of metadata, revision permission information 4147 of metadata, control permission information 4148 according to metadata generated by a user, moving range specifying information 4149 according to metadata generated by a user, and the like.

The signer identification information 4145 is information for specifying a signer of metadata that can be used, and includes: a signer ID; a content provider; a group of metadata providers trusted by the above mentioned content provider; and a flag indicating no-limit of such group as described above. In other words, as the signer identification information 4145, for example, as the metadata signer, signer identification information such as "impossible except for the content provider", "possible for the content provider and metadata provider authorized by the content provider" or "possible for all" are included. Here, the metadata provider authorized by the content provider is a metadata provider having a public key certificate 510 digitally signed by the content provider, and has a higher credibility of the content distribution server 20 than the other metadata providers. The metadata signer identification information 4145 may be the metadata signer ID312 which permits or disapproves.

The reference specification information 4146 is information which specifies a reference method of metadata when using content, and includes: a flag specifying the necessity of referring to metadata; a metadata ID to be referred to; a signer ID of the metadata to be referred to, and the like. In other words, as the metadata reference specification information 4146, for example, in the case where it is desired to force the reference of the metadata 310 to be distributed with the encryption content 210, the metadata reference specifying flag is included. The reference specification information 4146 may be either of the metadata reference specifying flag, the metadata ID of the metadata desired to force a reference, or the metadata signer ID of the metadata. According to the present embodiment, the example of including the metadata reference specification information 4146 in the content license is described. However, the encryption content 210 may include the reference specification information 4146.

The revision permission information 4147 includes: a flag indicating the metadata revision permission, the revisable metadata ID, a signer ID of the revisable metadata, a content provider, a group of metadata providers trusted by the above mentioned content provider, and a flag indicating no-limit of such metadata providers. In other words, the revision permission information 4147 of metadata may be, for example, either of a flag indicating "metadata revisable" or "metadata non-revisable", a metadata ID of the revisable metadata or non-revisable metadata, or a metadata signer ID 312 which has digitally signed the revisable metadata or non-revisable metadata.

According to the present embodiment, the case where the revision permission information 4147 of metadata is included in the content license is described. However, the revision permission information 4147 may be included in either of the following: the encryption content 210; the metadata body 311 of the metadata 310; or the license of the metadata 310 in the case where the metadata 310 is encrypted as well as the content and there is a license of the metadata 310 including an encryption key.

The control permission information 4148 is a flag indicating the use permission of the metadata generated by the user. In other words, as the control permission information 4148 according to the metadata generated by the user, for example, information such as "control possible according to the metadata generated by the user" or "control impossible according to the metadata generated by the user" is included. According to the present embodiment, the case where the control permission information 4148 according to the metadata generated by the user is included in the content license is described. However, the control permission information 4148 according to the metadata generated by the user may be included in the encryption content 210.

The moving range specifying information 4149 is information which specifies one or more terminal apparatuses which have generated metadata generated by the user possible to be used. And, the moving range specifying information 4149 includes: a flag indicating no-limit or limiting to one or more terminal apparatuses owned by the user who has generated the metadata; the use frequency which limits the use in one or more terminal apparatuses except for the one or more terminal apparatuses owned by the user who has generated the metadata; the expiration date and the like.

In other words, as the moving range specifying information 4149, for example, information indicating the moving range such as "move unlimited" or "limiting to one or more terminal apparatuses owned by the user who has generated the metadata" is included. According to the present invention, the case where the moving range specifying information 4149 of the metadata generated by the user is included in the content license is described. However, the moving range specifying information 4149 may be included in either of the following: the encryption content 210; the metadata body 311 of the metadata 310; and the metadata license in the case where he metadata is encrypted as well as the content, and there is a license of the metadata including an encryption key.

After the license generation is finished, the license management server 40, according to the license obtainment request from the one or more terminal apparatuses 60, after executing a purchase process of the license, transmits the license 410 to the one or more terminal apparatuses 60 (S1310). The purchase process of the license is executed between the purchase server which is not shown in the drawings and the license management server 40.

In the case where the license 410 is communicated between the license management server 40 and the one or more terminal apparatuses 60 through the transmission path N, in order to ensure security, after establishing SAC, data is communicated.

According to the present embodiment, after the SAC is established between the license management server 40 and the one or more terminal apparatuses 60, the license 410 is communicated. However, in the case where an intrinsic key is stored in the one or more terminal apparatuses 60, and the license management server 40 manages the intrinsic key of each terminal apparatus 60, the license 410 may be encrypted using the intrinsic key of the one or more terminal apparatuses 60, and transmitted from the license management server 40 to the one or more terminal apparatuses 60.

The one or more terminal apparatuses 60 receive the license 410 from the license management server 40 (S1020), and store the license 410 in the memory unit of the tamper-proof unit.

Next, the receiving process of the public key certificate 510 and the CRL 520 will be specifically explained.

The one or more terminal apparatuses 60 transmit a request for a public key certificate to the content distribution server 20, and receives the public key certificate 510 of the content distribution server 20. Also, the one or more terminal apparatuses 60 transmit a request for a public key certificate to the metadata distribution server 30, and receive the public key certificate 510 of the metadata distribution server 30. Moreover, the one or more terminal apparatuses 60 transmit a request for a public key certificate to the authentication server 50, and receive the public key certificate 510 of the authentication server 50.

Although it is not shown in FIG. 2, every time the content distribution server 20 and the metadata distribution server 30 request the public key certificate 510, the authentication server 50 generates the public key certificate 510, and transmits the public key certificate 510 to the content distribution server 20 and the metadata distribution server 30. Also, every time the content distribution server 20 requests a revoke of the metadata distribution server 30, the authentication server 50 generates a CRL, and transmits the generated CRL to the one or more terminal apparatuses 60.

More specifically, the authentication server 50 has a secret key and a public key paired with the secret key. And, when the content distribution server 20 and the metadata distribution server 30, as subjects, request the generation of the public key certificate 510, in exchange for the public key 512 of the subjects, the authentication server 50 transmits the public key certificate 510 to the subjects. In other words, after receiving the generation request of the public key certificate 510 including the subject public key 512 from the content distribution server 20 or the metadata distribution server 30, the authentication server 50 (i) generates a subject ID 511 which differs for each subject public key 512, (ii) generates a digital signature 513 for the subject ID 511 and the subject public key 512, (iii) generates a public key certificate 510 made of the subject ID 511, the subject public key 512 and the digital signature 513, and (iv) transmits the public key certificate 510 to the content distribution server 20 or the metadata distribution server 30.

In the case where the content distribution server 20 authorizes the digital signature of the metadata to the trusted metadata distribution server 30, the content distribution server 20 may execute the generation process of the public key certificate 510 of the metadata distribution server 30.

In such case as described above, the metadata distribution server 30 having the public key certificate 510 digitally signed by the content distribution server 20 may be judged as trusted by the content distribution server 20 more than the other metadata distribution server 30. Such method as described above is a general method called a certificate pass, and specifically explained in non-patent literature 1.

Figure 7:
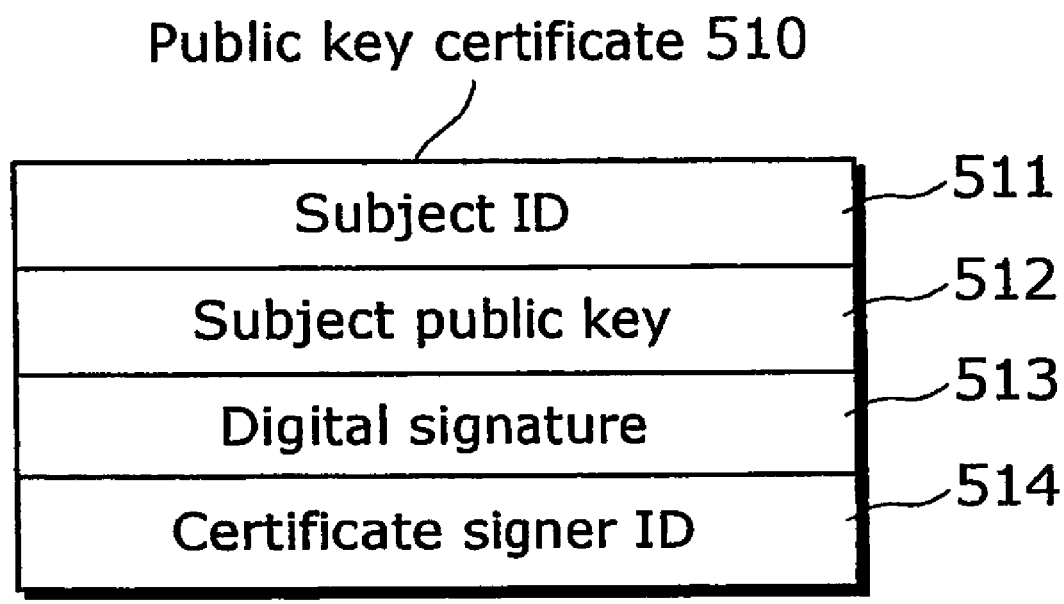
FIG. 7 is a diagram showing the structure of the public key certificate 510 according to the embodiment of the present invention.

The public key certificate 510, as shown in FIG. 7, includes, at least, the subject ID 511, the subject public key 512, the digital signature 513 and the certificate signer ID 514. The subject ID 511 is an ID identifying the subject of the public key certificate 510, and, for example, the serial number of the X. 509 certificate may be used.

The subject public key 512 is used for verification of the digital signature of the signer specified by the subject ID 511. The digital signature 513 is used for the tamper detection of, at least, the subject ID 511 and the subject public key 512. The certificate signer ID 514 is used for specifying the signer who has digitally signed the public key certificate 510.

Figure 8:
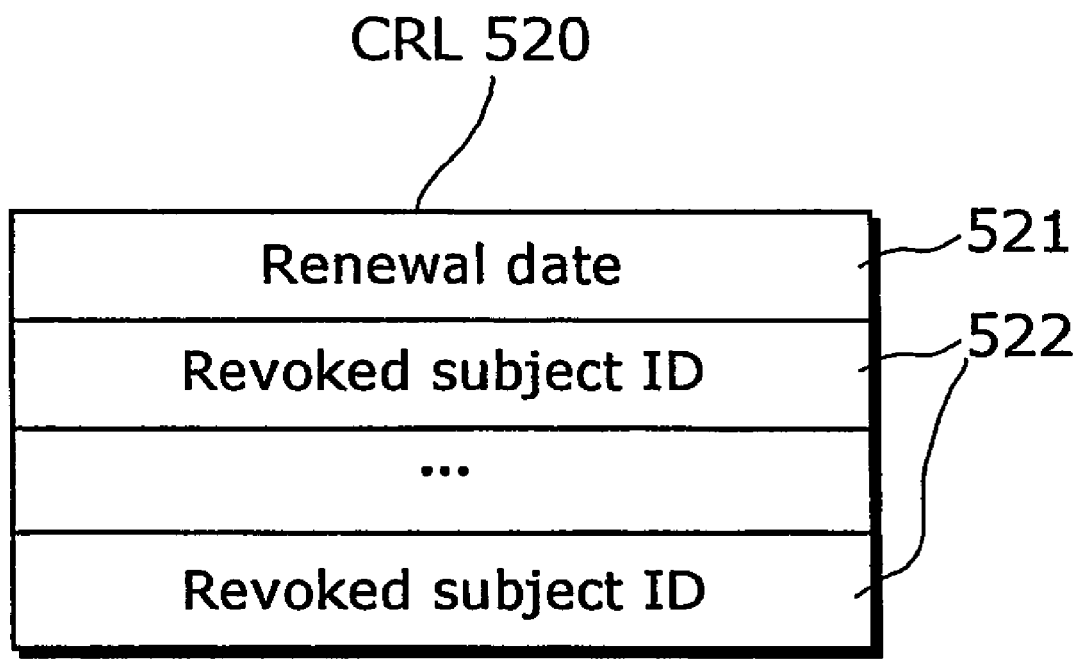
FIG. 8 is a diagram showing the structure of the CRL 520 according to the embodiment of the present invention.

Also, the authentication server 50 has a CRL 520. The CRL 520, as shown in FIG. 8, includes, at least, a renewal date 521 and a revoked subject ID 522. Here, a revoke means to revoke the digital signature by the signer specified by the subject ID 522.

The renewal date 521 is, for example, a date when the CRL 520 is generated, and used for the version confirmation of the CRL 520. The revoked subject ID522 is used for identifying the signer to be revoked.

After receiving a request for the CRL renewal including the ID of the metadata distribution server 30 to be revoked from the content distribution server 20, the authentication server 50 (i) renews the renewal date 521 to the CRL generation date, for example, from "Jan. 1, 2003" to "Nov. 11, 2003", (ii) adds the received ID of the metadata distribution server 30 to the subject ID522, (iii) generates the CRL 520, and (iv) transmits the CRL 520 to the one or more terminal apparatuses 60.

As described above, the domain key 112 is obtained from the membership management server 10 (S1000); the encryption content 210 is received from the content distribution server 20 (S1010); the license 410 is received from the license management server 40 (S1020); the metadata 310 is received from the metadata distribution server 30 (S1030); and the one or more terminal apparatuses 60 use the metadata 310 and the content (S1040).

Next, the use permission judgment of the metadata signed by the content distribution server 20 or the metadata distribution server 30 and the metadata generated by the user will be explained.

Figure 9:
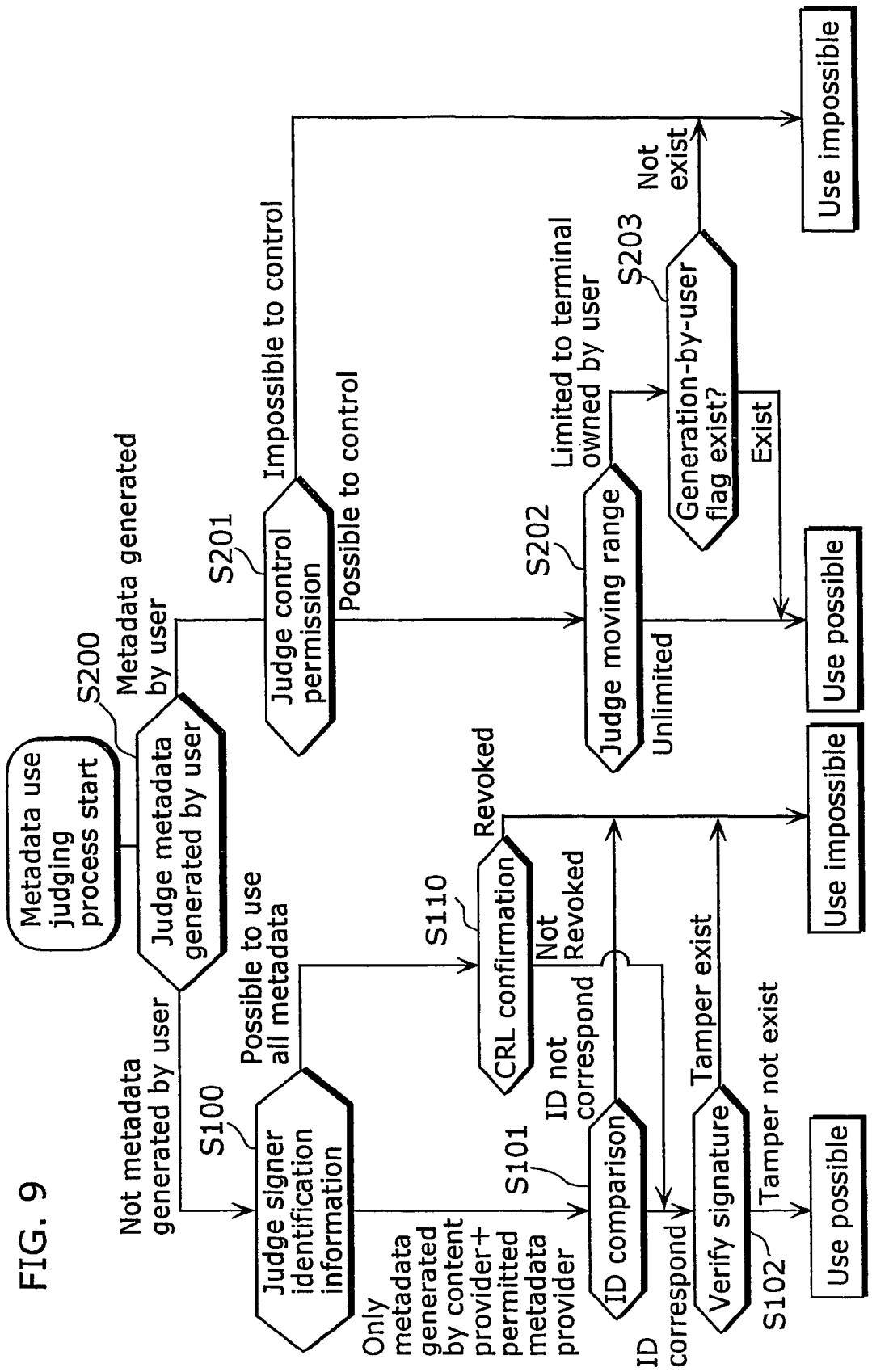
FIG. 9 is a flow chart showing the processes of the use permission judgment of (i) the metadata signed by a content distribution server 20 or a metadata distribution server 30 or (ii) the metadata generated by a user, according to the embodiment of the present invention.

FIG. 9 is a flow chart showing the operations of the use permission judging process of the metadata by the one or more terminal apparatuses 60.

The metadata 310 judges whether or not the metadata is the metadata generated by the user (S200). The process of judging metadata generated by the user (S200) will be explained later.

In the case where the metadata is not the metadata generated by the user, the process is transited to the signer identification information judgment (S100). In the case where the metadata is the metadata generated by the user (in the case of the later mentioned value "0"), the process is transited to the step S201. In the signer identification information judgment (S100), the signer identification information 4145 is obtained from the usage rules 414 of the license 410, and judged which of the following the signer identification information 4145 is: "impossible except for the content provider", "possible for the content provider and the metadata provider authorized by the content provider", or "possible for all".

In the case where the signer identification information 4145 is either "impossible except for the content provider" or "possible for the content provider and the metadata provider authorized by the content provider", the process is transited to the ID comparison (S101).

The ID comparison (S101) will be explained using FIG. 10.

Figure 10:
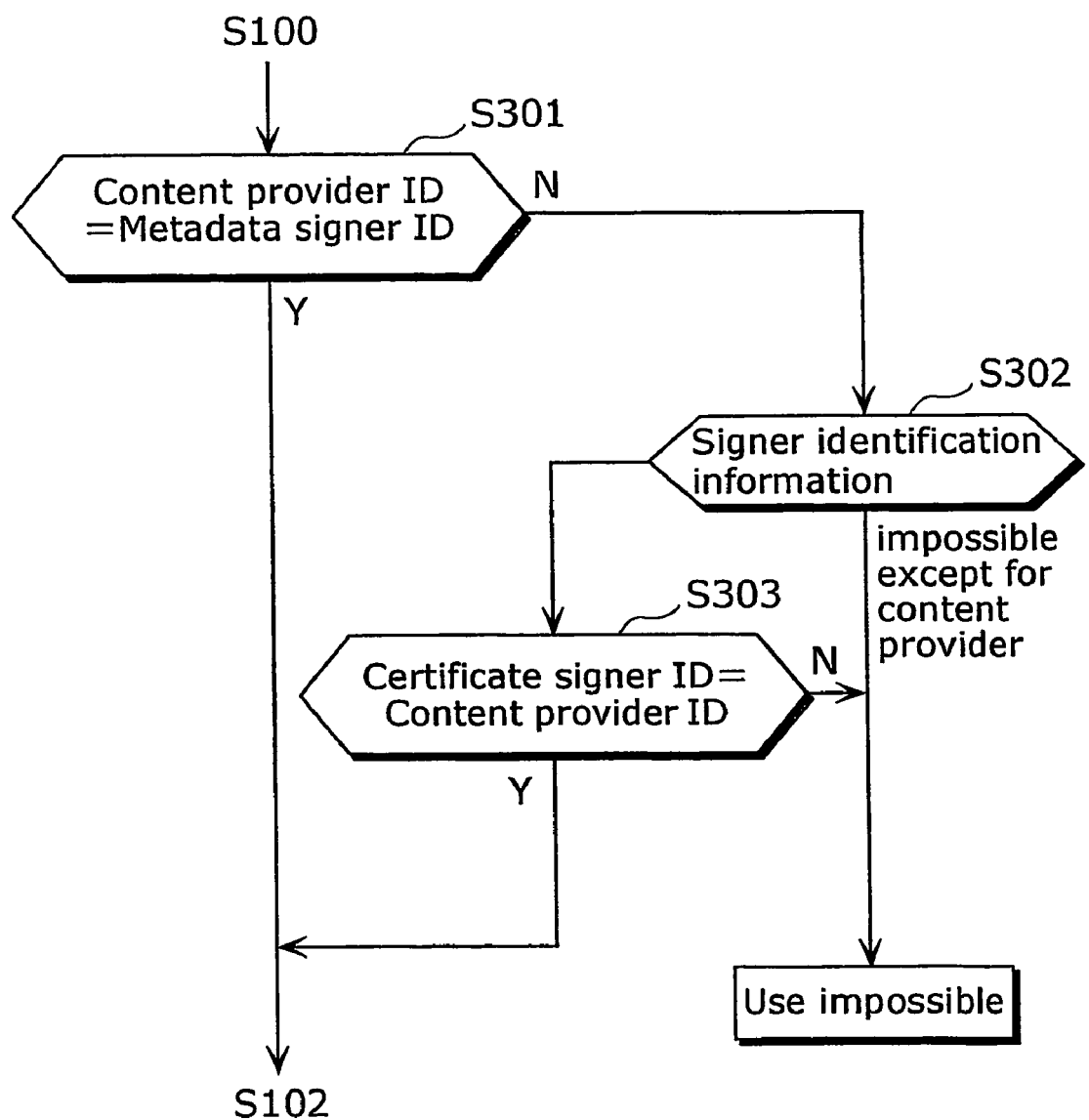
FIG. 10 is a flow chart showing the sub-routine of the ID comparison (S101) process as shown in FIG. 9.

FIG. 10 is a flow chart showing the sub-routine of the ID comparison (S101).

In the ID comparison (S101), (i) the encryption content 210 is decrypted by the content encryption key 415, (ii) the content provider ID212 is obtained, (iii) the metadata signer ID312 is obtained from the metadata 310, and (iv) the above mentioned content provider ID212 and metadata signer ID312 are compared (S301).

In the case where the content provider ID212 corresponds with the metadata signer ID312, the process is transited to the signature verification (S102). In other words, in such case as described above, in order to fulfill the requirement that "only the metadata generated by the content provider can be used", the process is advanced to the step S102.

In the case where the content provider ID212 and the metadata signer ID312 do not correspond with each other, the signer identification information 4145 is confirmed (S302).

In the case where the signer identification information 4145 is "possible for the content provider and the metadata provider authorized by the content provider", the content provider ID212 is compared with the certificate signer ID514 of the public key certificate 510 for which the metadata signer ID312 and the subject ID511 correspond with each other (S303).

In the case where the certificate signer ID514 and the content provider ID212 correspond with each other, the process is transited to the signature verification (step S102). In other words, in order to fulfill the requirement that "possible for the content provider and the metadata provider authorized by the content provider", the process is advanced to the step S102.

On the other hand, in the case where in the step S302 the signer identification information 4145 is "impossible except for the content provider", even if the signer identification information 4145 sets the signer of the metadata possible to be used as "except for the content provider", as the signer of the metadata 310 is other than the content distribution server 20, the metadata 310 cannot be used.

Also, in the step S303, in the case where the certificate signer ID514 and the content provider ID212 do not correspond with each other, even if the signer identification information 4145 sets the signer of the metadata possible to be used as "possible for the content provider and the metadata provider authorized by the content provider", as the signer of the metadata is other than the content distribution server 20 and the metadata distribution server 30 authorized by the content distribution server 20, the metadata 310 cannot be used.

Going back to the main routine of FIG. 9, in the case where the content provider ID212 and metadata signer ID312 correspond with each other, (i) the signature verification is executed (S102), (ii) the public key certificate 510 including the subject ID511 corresponding with the metadata signer ID312 of the digital signature of the metadata is obtained, (iii) the digital signature of the metadata is decrypted using the subject public key 512 included in the public key certificate 510, (iv) the hash values of the metadata body 311 and the metadata signer ID312 are compared, and verified whether or not they correspond with each other. In the case where the above mentioned hash values of the metadata body 311 and the metadata signer ID312 correspond with each other, as there has not been tamper, the metadata 310 is judged as possible to be used. On the other hand, in the case where the above mentioned hash values of the metadata body 311 and the metadata signer ID312 do not correspond with each other, as there has been tamper, the metadata 310 is judged as impossible to be used.

On the other hand, in the step S100, the signer identification information 4145 is "possible for all", the process is transited to the CRL confirmation (S110).

In the CRL conformation (S110), whether or not the metadata signer ID312 of the metadata 310 is included in the revoked subject ID522 of the CRL 520 is judged. In the case where the metadata signer ID312 is not included in the revoked subject ID522, the process is transited to the signature verification (S102), and the use permission is judged depending on the existence of tamper.

On the other hand, in the case where the metadata signer ID312 is included in the list, as the signer is revoked, the metadata 310 is judged as impossible to be used.

By such processes as described above, based on the signer identification information 4145 stored in the usage rules 414 of the license 410, it is possible to judge the use permission of the metadata signed by the content distribution server 20 or the metadata distribution server 30.

According to the present embodiment, the signer identification information 4145 is the flag which identifies one value out of the three values such as "impossible except for the content provider", "possible for the content provider and the metadata provider authorized by the content provider" or "possible for all". However, the signer identification information 4145 may be a flag identifying one value out of at least two values among "impossible except for the content provider", "possible for the content provider and the metadata provider authorized by the content provider" or "possible for all".

In such case as described above, for example, if the signer identification information 4145 is the flag identifying "impossible except for the content provider" or "possible for all", the process of the case where the signer identification information 4145 according to the present embodiment is "possible for the content provider and the metadata provider authorized by the content provider" is not executed. If the signer identification information 4145 is a flag identifying "impossible except for the content provider" or "possible for the content provider and the metadata provider authorized by the content provider" the process of the case where the signer identification information 4145 is "possible for all" is not executed. However, the same effects can be achieved in either of the above mentioned cases.

According to the present embodiment, in the signer identification information judgment (S100), when the signer identification information 4145 is "impossible except for the content provider" or "possible for the content provider and the metadata provider authorized by the content provider", the CRL confirmation (S110) is not executed, but may be executed after the signer identification information judgment (S100).

According to the present embodiment, the signer identification information 4145 is stored in the usage rules 414 of the license 410. However, the signer identification information 4145 may be stored in the areas other than the usage rules 414 in the license 410. Also, the signer identification information 4145 may be stored in the encryption content 210. Moreover, in the case where metadata is encrypted as well as the content, and there is a license of the metadata 310 including an encryption key, the signer identification information 4145 may be stored in the license of the metadata 310. In such cases as described above, the obtainment sources of the signer identification information 4145 respectively differ, but the same effects can be achieved in each case.

According to the present embodiment, the signer identification information 4145 is a flag indicating "impossible except for the content provider", "possible for the content provider and the metadata provider authorized by the content provider" or "possible for all". However, the signer identification information 4145 may be the metadata signer ID312 of the metadata 310. In such case as described above, the signer of the metadata possible to be used is limited to the signer of the metadata signer ID312. However, the same effects can be achieved.

According to the present embodiment, for the ID comparison (S101) of whether or not the metadata signer ID312 of the metadata 310 is the content provider ID, the content provider ID212 included in the encryption content 210 is used. However, in the case where only the public key certificate 510 of the content provider is stored in advance, such as when transmitting to the one or more terminal apparatuses 60, the subject ID511 included in the public key certificate 510 may be used. Also, in the case where only the content provider ID is stored in advance, such as when transmitting to the one or more terminal apparatuses 60, the stored content provider ID may be used. Moreover, in the case where there is a license of the metadata 310, and the content provider ID is stored in the license of the metadata 310, the content provider ID of the license of the metadata 310 may be used. In either of such cases as described above, as the content provider ID of the content distribution server 20 can be specified, the same effects can be achieved.

Next, before moving on to the explanation of the use permission of the metadata generated by the user, the generation process of metadata by the user and the like will be explained.

According to the input operation of the user, the one or more terminal apparatuses 60 generate metadata. Specifically, when "1" is set for the generation-by-user flag 3115 indicating that it is the metadata generated by the user, information such as a scene index is stored in the metadata body 311. And, in order to indicate that the metadata generator is the user, the value "0" is stored in the metadata signer ID312, and the value "0" is stored without digitally signing the digital signature 313.

According to the present embodiment, the case where the value "0" is stored in the metadata signer ID312 and the digital signature 313 is described. However, as long as it can be identified that the metadata 310 is generated by the user in the one or more terminal apparatuses 60, other values may be used.

According to the present embodiment, the metadata generated by the user is not digitally signed. However, in the case where all of the one or more terminal apparatuses 60 have the metadata signer ID312, a secret key and a public key certificate 510, the metadata generated by the user may be digitally signed. In such case as described above, in the later mentioned judgment of the metadata generated by the user (S200), whether or not the digital signer of the metadata 310 is the one or more terminal apparatuses 60 owned by the user is judged.

In the case where the one or more terminal apparatuses 60 do not have a secret key and a public key certificate, by encrypting the hash value of the metadata 310 using the domain key 112 or the intrinsic key, the same effects can be achieved.

The one or more terminal apparatuses 60 obtain, from the usage rules 414, the moving range specifying information 4149 of the metadata generated by the user. In the case of "move unlimited", the metadata generated by the above mentioned process is accumulated, as it is, in the one or more terminal apparatuses 60 and the like. In the case of "limited to the one or more terminal apparatuses owned by the user who has generated the metadata", the metadata body 311 may be encrypted by the domain key 112 and accumulated in the one or more terminal apparatuses 60 or an external memory medium such as a DVD-R. Otherwise, the metadata body 311 may be transmitted to the other terminal apparatuses owned by the user. In such case as described above, as the metadata body 311 is encrypted by the domain key, even if one or more terminal apparatuses 60 of a different domain obtain the metadata 310, the metadata 310 cannot be used.

According to the present embodiment, in the case where the moving range specifying information 4149 of the metadata generated by the user is "limited to the one or more terminal apparatuses owned by the user who has generated the metadata", the metadata body 311 is encrypted using the domain key 112. However, as long as the secret information common to the one or more terminal apparatuses 60 owned by the user is used, other information may be used.

Next, the use permission judgment of the metadata generated by the user will be explained using FIG. 9.

The one or more terminal apparatuses 60 execute judgment of the metadata generated by the user (S200).

In the judgment of the metadata generated by the user (S200), whether the metadata signer ID312 of the metadata 310 is the value "0" is judged.

In the case where the signer ID312 of the metadata 310 is not the value "0", the process is transited to the above mentioned signer identification information judgment (S100).

In the case where the signer ID312 of the metadata is the value "0", the process is transited to the control permission judgment of the metadata generate by the user (S201).

In the control permission judgment of the metadata generated by the user (S201), the control permission information 4148 according to the metadata generated by the user is obtained from the usage rules 414 of the license 410. In the case where the control permission information 4148 according to the metadata generated by the user is "control possible according to the metadata generated by the user", the process is transited to the moving range judgment of the metadata generated by the user (S202).

In the moving range judgment of the metadata generated by the user (S202), the moving range specifying information 4149 of the metadata generated by the user is obtained from the usage rules 414 of the license 410. In the case where the moving range specifying information 4149 is "move unlimited", the metadata generated by the above mentioned process is judged as possible to be used.

On the other hand, in the case where the moving range specifying information 4149 of the metadata generated by the user is "limited to the one or more terminal apparatuses owned by the user who has generated the metadata", the metadata body 311 is decrypted by the domain key 112, and whether or not there is a generation-by-user flag 3115 indicating that the metadata is the metadata generated by the user (S203). As a result of the judgment, in the case where there is a generation-by-user flag 3115, that is, in the case where "1" is set in the generation-by-user flag 3115, the metadata 310 is judged as possible to be used.

In the case where there is not a generation-by-user flag 3115 that is, in the case where "0" is set in the generation-by-user flag 3115, the metadata 310 cannot be used.

Also, as a result of the judgment of the step S201, in the case where "control according to the metadata generated by the user is impossible", the metadata 310 cannot be used.

By such processes as described above, based on the control permission information 4148 and the moving range specifying information 4149, it is possible to judge the use permission of the metadata generated by the user.

According to the present embodiment, the moving range specifying information 4149 is a flag indicating either of "control possible according to the metadata generated by the user" or "control impossible according to the metadata generated by the user". In the case where the moving range specifying information 4149 is "control possible according to the metadata generated by the user", by encrypting the metadata generated by the user using the domain key 112, the moving range of the metadata generated by the user is limited to the one or more terminal apparatuses owned by the user. However, the usage rules such as the moving frequency and the moving expiration date may be stored as the moving range specifying information 4149, and the metadata generated by the user may be encrypted by the encryption key generated by the one or more terminal apparatuses 60. Also, by setting, in the license of the metadata generated by the user including the encryption key, the usage rules such as the moving frequency and the moving expiration date stored as the moving range specifying information 4149, the moving may be limited. In such case as described above, the moving range of the metadata generated by the user is limited by the moving frequency and the moving expiration date stored as the moving range specifying information 4149.

The verification of the public key signature requires a long processing time. It is inefficient to repeatedly verify the once verified metadata using the public key. Thus, in the case where the control according to the metadata generated by the user is possible, that is, in the case where the content provider permits, by regarding the normal metadata judged as possible to be used as the metadata generated by the user, the signature verification process can be omitted. Thus, the processing time can be reduced to a large extent.

Hereinafter, the process executed in the case where in the above mentioned judgment process the metadata 310 is judged as possible to be used will be explained.

First, the use process of the content which has a mandatory reference to the metadata will be explained.

The one or more terminal apparatuses 60 detect, from the usage rules 414 of the license 410, whether or not the reference specification information 4146 of the metadata exists. In the case where the reference specification information 4146 does not exist, the use of the encryption content 210 is started. In the case where the reference specification information 4146 exists, the reference specification information 4146 is obtained. And, the metadata to be referred to is obtained from the metadata ID included in the reference specification information 4146. In the case where in the use permission judgment of the metadata the metadata is judged as possible to be used, the use of the content is started in reference to the metadata. In the case where the metadata to be referred to cannot be obtained and in the case where in the use permission judgment the use of the metadata is judged as impossible to be used, the content cannot be used.

According to the present embodiment, the reference specification information 4146 is the metadata ID. However, the reference specification information 4146 may be the metadata signer ID312.

According to the present embodiment, the reference specification information 4146 is the metadata ID. However, for example, in the case where the encryption content 210 and the metadata 310 are both transmitted to the one or more terminal apparatuses 60, and the encryption content 210 and the metadata 310 are associated with each other, the reference specification information 4146 may be the flag for identifying whether to refer or not to refer to the above mentioned encryption content 210 and metadata 310.

The one or more terminal apparatuses 60 obtain the revision permission information 4147 of the metadata from the usage rules 414 of the license 410, and make a judgment from either of "metadata revisable" or "metadata non-revisable".

In the case where the revision permission information 4147 of the metadata is "metadata non-revisable", the metadata 310 including the content ID211 of the encryption content 210 in the metadata body 311 cannot be revised.

In the case where the revision permission information 4147 is "metadata revisable", according to the user's operation, the metadata 310 including the content ID211 of the encryption content 210 in the metadata body 311 is revised. A request for a re-digital signature including the revised metadata 310 is transmitted to the signer of the metadata signer ID312. And, the signer of the metadata signer ID312 receives the re-digitally signed metadata 310.

According to the present embodiment, the revision permission information 4147 is a flag indicating either of "metadata revisable" or "metadata non-revisable". However, the revision permission information 4147 may be the metadata ID of the revisable metadata 310. In such case as described above, only the metadata 310 specified by the revision permission information 4147 is judged as possible to be revised.

Also, the revision permission information 4147 may be the metadata ID of the non-revisable metadata 310. In such case as described above, only the metadata 310 specified by the revision permission information 4147 is judged as non-revisable.

According to the present embodiment, after revising the metadata 310, the metadata 310 is re-digitally signed by the signer of the metadata signer ID312. However, in the case where the one or more terminal apparatuses 60 have a public key, a secret key and a public key certificate 510, the one or more terminal apparatuses 60 may digitally sign the metadata 310.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The content distribution system 1 according to the present embodiment can control the use of the metadata 310 by the content distribution server 20, and is beneficial as the content distribution system which can exclude the metadata with low credibility unintended by the content distribution server 20.

The invention claimed is:

1. A method for controlling a terminal apparatus, the terminal apparatus being connected to a network, the network including i) a content distribution server, ii) a metadata distribution server, iii) a license management server and iv) an authentication server, i) the content distribution server storing content and a content provider ID, and generating (a) a public key certificate of the metadata distribution server that is authorized by the content distribution server which includes a subject ID indicating the metadata distribution server, and (b) a digital sign for the subject ID, the public key certificate also including a certificate signer ID identifying a signer that digitally signs the public key certificate, ii) the metadata distribution server storing metadata, the metadata being used for supplementing the content, the metadata including a metadata signer ID, the metadata signer ID indicating a signer that digitally signs the metadata, iii) the license management server storing usage control information for the content and the metadata, the usage control information including signer identification information, the signer identification information identifying a range of a provider that is permitted to provide the metadata to the terminal apparatus, iv) the authentication server receiving from one of the content distribution server and the metadata distribution server a request for a generation of a public key certificate, generating a subject ID indicating the one of the content distribution server and the metadata distribution server that transmits the request to the authentication server, generating a digital sign for the subject ID, and generating the public key certificate including the subject ID and the digital sign, the public key certificate also including a certificate signer ID, the certificate signer ID identifying a signer that digitally signs the public key certificate, the method comprising:

receiving, at the terminal apparatus, the content and the content provider ID stored in the content distribution server;

receiving, at the terminal apparatus from the license management server, the usage control information;

receiving, at the terminal apparatus from the metadata distribution server, the metadata;

receiving, at the terminal apparatus, the public key certificate generated by the authentication server or the content distribution server;

judging, at the terminal apparatus, whether the received content provider ID matches the metadata signer ID included in the metadata, when the range included in the usage control information indicates i) the content distribution server or ii) the content distribution server and the metadata distribution server that is authorized by the content distribution server;

judging, at the terminal apparatus, whether the received content provider ID matches the certificate signer ID included in the public key certificate whose subject ID matches the metadata signer ID, when it is judged that the content provider ID does not match the metadata signer ID and when the range included in the usage control information indicates the content distribution server and the metadata distribution server that is authorized by the content distribution server; and determining, at the terminal apparatus, that the metadata is available to the terminal apparatus, i) when it is judged that the content provider ID matches the metadata signer ID or ii) when it is judged that the content provider ID matches the certificate signer ID.

2. The method according to claim 1, wherein the metadata comprises user metadata generated by a user of the terminal apparatus.

3. The method according to claim 2, wherein the user metadata does not include the metadata signer ID.

4. The method according to claim 2, wherein the user metadata is encrypted by secret information common to one or more terminal apparatuses owned by the user of the terminal apparatus.

5. The method according to claim 1, wherein the usage control information includes revision permission information, the revision permission information indicating whether the metadata is permitted to be revised, and the method further comprises judging whether the metadata is permitted to be revised based on the revision permission information, when it is determined that the metadata is available to the terminal apparatus.

6. The method according to claim 2, wherein the usage control information includes control permission information, the control permission information indicating whether the user metadata is permitted to be used, and the method further comprises judging whether the user metadata is permitted to be used based on the control permission information.

7. The method according to claim 2, wherein the user metadata is encrypted by a predetermined encryption key, wherein the usage control information includes control permission information, the control permission information indicating whether the user metadata is permitted to be used, wherein the usage control information includes moving range specifying information, the moving range specifying information indicating whether the user metadata is permitted to be moved out of the terminal apparatus, and wherein the method further comprises:

judging whether the user metadata is permitted to be used based on the control permission information;

judging whether the user metadata is permitted to be moved out of the terminal apparatus based on the moving range specifying information, when it is judged that the user metadata is permitted to be used based on the control permission information; and decrypting the user metadata using a predetermined decryption key corresponding to the predetermined encryption key.

8. The method according to claim 7, wherein the predetermined encryption key comprises secret information common to one or more terminal apparatuses owned by the user of the terminal apparatus.

9. A terminal apparatus being connected to a network, the network including a content distribution server, a metadata distribution server, a license management server and an authentication server, the content distribution server storing content and a content provided ID, and generating (a) a public key certificate of the metadata distribution server that is authorized by the content distribution server which includes a subject ID indicating the metadata distribution server, and (b) a digital sign for the subject ID, the public key certificate also including a certificate signer ID identifying a signer that digitally signs the public key certificate, the terminal apparatus comprising:

a storage unit;

a receiving unit for i) receiving the content and the content provider ID stored in the content distribution server, ii) receiving metadata stored in the metadata distribution server, the metadata being used for supplementing the content and including a metadata signer ID, the metadata signer ID indicating a signer that digitally signs the metadata, iii) receiving, from the license management server, usage control information for the content and the metadata, the license management server storing the usage control information for the content and the metadata, the usage control information including signer identification information, the signer identification information identifying a range of a provider that is permitted to provide the metadata to the terminal apparatus, and iv) receiving a public key certificate generated by the authentication server or the content distribution server, the authentication server receiving from one of the content distribution server and the metadata distribution server a request for a generation of the public key certificate, generating a subject ID indicating the one of the content distribution server and the metadata distribution server that transmits the request to the authentication server, generating a digital sign for the subject ID, and generating the public key certificate including the subject ID and the digital sign, the public key certificate also including a certificate signer ID, the certificate signer ID identifying a signer that digitally signs the public key certificate; and a judging unit for i) judging whether the received content provider ID matches the metadata signer ID included in the metadata, when the range included in the usage control information indicates a) the content distribution server or b) the content distribution server and the metadata distribution server that is authorized by the content distribution server, ii) judging whether the received content provider ID matches the certificate signer ID included in the public key certificate whose subject ID matches the metadata signer ID, when it is judged that the content provider ID does not match the metadata signer ID and when the range included in the usage control information indicates the content distribution server and the metadata distribution server that is authorized by the content distribution server, and iii) determining that the metadata is available to the terminal apparatus, a) when it is judged that the content provider ID matches the metadata signer ID or b) when it is judged that the content provider ID matches the certificate signer ID.

10. A system comprising:

a content distribution server for storing content and a content provider ID, and generating (a) a public key certificate of the metadata distribution server that is authorized by the content distribution server which includes a subject ID indicating the metadata distribution server, and (b) a digital sign for the subject ID, the public key certificate also including a certificate signer ID identifying a signer that digitally signs the public key certificate;

a metadata distribution server storing metadata, the metadata being used for supplementing the content, the metadata including a metadata signer ID, the metadata signer ID indicating a signer that digitally signs the metadata;

a license management server for storing usage control information for the content and the metadata, the usage control information including signer identification information, the signer identification information identifying a range of a provider that is permitted to provide the metadata to the terminal apparatus;

an authentication server for receiving from one of the content distribution server and the metadata distribution server a request for a generation of a public key certificate, generating a subject ID indicating the one of the content distribution server and the metadata distribution server that transmits the request to the authentication server, generating a digital sign for the subject ID, and generating the public key certificate including the subject ID and the digital sign, the public key certificate also including a certificate signer ID, the certificate signer ID identifying a signer that digitally signs the public key certificate; and a terminal apparatus, the terminal apparatus comprising:

a receiving unit for receiving the content and the content provider ID stored in the content distribution server, receiving from the license management server the usage control information, receiving from the metadata distribution server the metadata, and receiving the public key certificate generated by the authentication server or the content distribution server; and a judging unit for judging whether the received content provider ID matches the metadata signer ID included in the metadata, when the range included in the usage control information indicates i) the content distribution server or ii) the content distribution server and the metadata distribution server that is authorized by the content distribution server, judging whether the received content provider ID matches the certificate signer ID included in the public key certificate whose subject ID matches the metadata signer ID, when it is judged that the content provider ID does not match the metadata signer ID and when the range included in the usage control information indicates the content distribution server and the metadata distribution server that is authorized by the content distribution server, and determining that the metadata is available to the terminal apparatus, i) when it is judged that the content provider ID matches the metadata signer ID or ii) when it is judged that the content provider ID matches the certificate signer ID.

11. A computer-readable recording medium storing a program, the program controlling a terminal apparatus, the terminal apparatus being connected to a network, the network including i) a content distribution server, ii) a metadata distribution server, iii) a license management server and iv) an authentication server, i) the content distribution server storing content and a content provider ID, and generating (a) a public key certificate of the metadata distribution server that is authorized by the content distribution server which includes a subject ID indicating the metadata distribution server, and (b) a digital sign for the subject ID, the public key certificate also including a certificate signer ID identifying a signer that digitally signs the public key certificate, ii) the metadata distribution server storing metadata, the metadata being used for supplementing the content, the metadata including a metadata signer ID, the metadata signer ID indicating a signer that digitally signs the metadata, iii) the license management server storing usage control information for the content and the metadata, the usage control information including signer identification information, the signer identification information identifying a range of a provider that is permitted to provide the metadata to the terminal apparatus, iv) the authentication server receiving from one of the content distribution server and the metadata distribution server a request for a generation of a public key certificate, generating a subject ID indicating the one of the content distribution server and the metadata distribution server that transmits the request to the authentication server, generating a digital sign for the subject ID, and generating the public key certificate including the subject ID and the digital sign, the public key certificate also including a certificate signer ID, the certificate signer ID identifying a signer that digitally signs the public key certificate, the computer program controlling the terminal apparatus to execute a following method, the method comprising:

receiving, at the terminal apparatus, the content and the content provider ID stored in the content distribution server;

receiving, at the terminal apparatus from the license management server, the usage control information;

receiving, at the terminal apparatus from the metadata distribution server, the metadata;

receiving, at the terminal apparatus, the public key certificate generated by the authentication server or the content distribution server;

judging, at the terminal apparatus, whether the received content provider ID matches the metadata signer ID included in the metadata, when the range included in the usage control information indicates i) the content distribution server or ii) the content distribution server and the metadata distribution server that is authorized by the content distribution server;

judging, at the terminal apparatus, whether the received content provider ID matches the certificate signer ID included in the public key certificate whose subject ID matches the metadata signer ID, when it is judged that the content provider ID does not match the metadata signer ID and when the range included in the usage control information indicates the content distribution server and the metadata distribution server that is authorized by the content distribution server; and determining, at the terminal apparatus, that the metadata is available to the terminal apparatus, i) when it is judged that the content provider ID matches the metadata signer ID or ii) when it is judged that the content provider ID matches the certificate signer ID.

* * * * *